April 25, 1933.  M. W. EVANS  1,906,143
HELICOPTER
Filed May 27, 1932  3 Sheets-Sheet 3
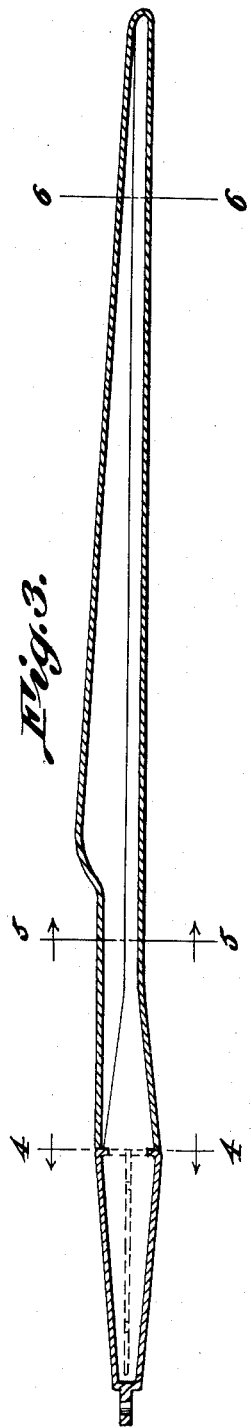
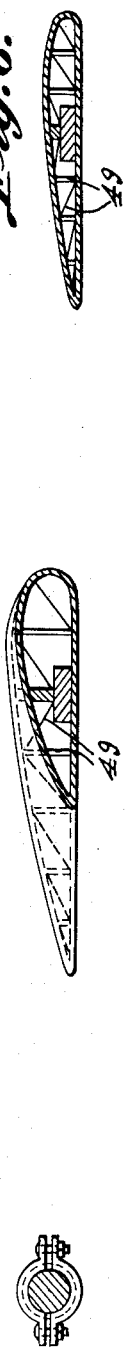
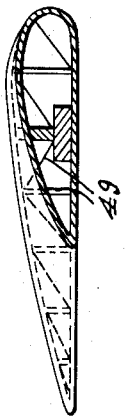
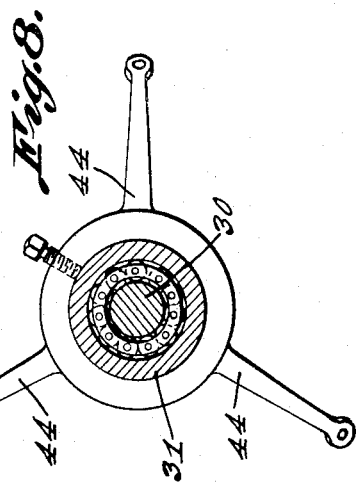
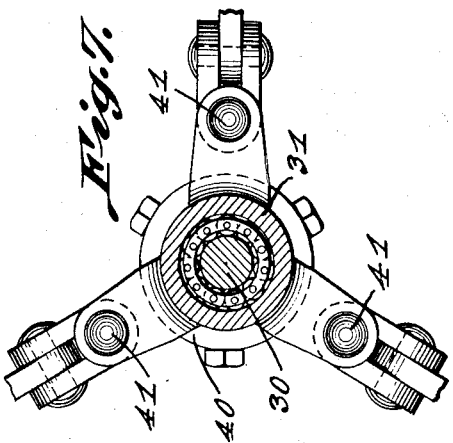
M. W. Evans, INVENTOR
BY Victor J. Evans & Co.
ATTORNEY Patented Apr. 25, 1933

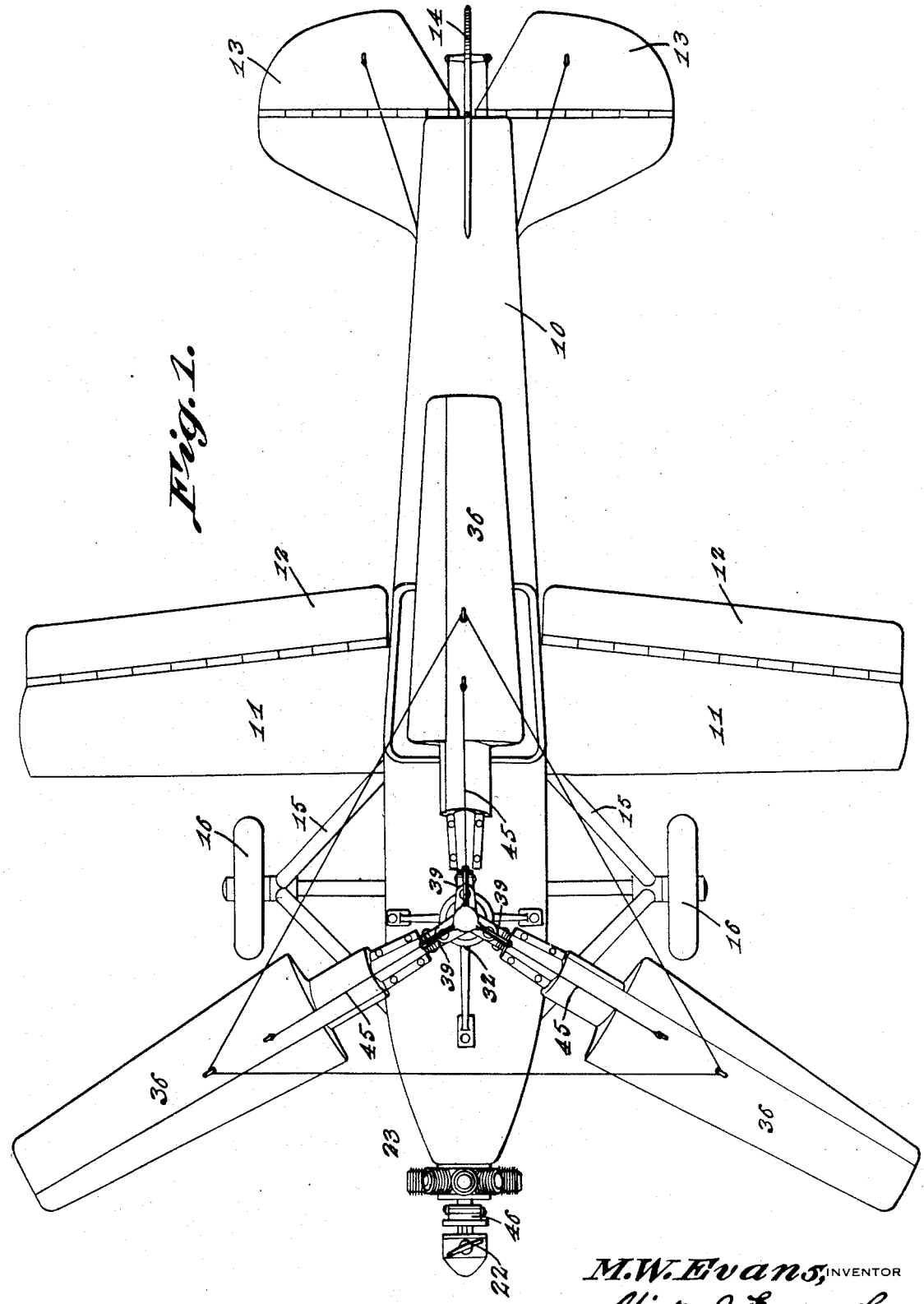

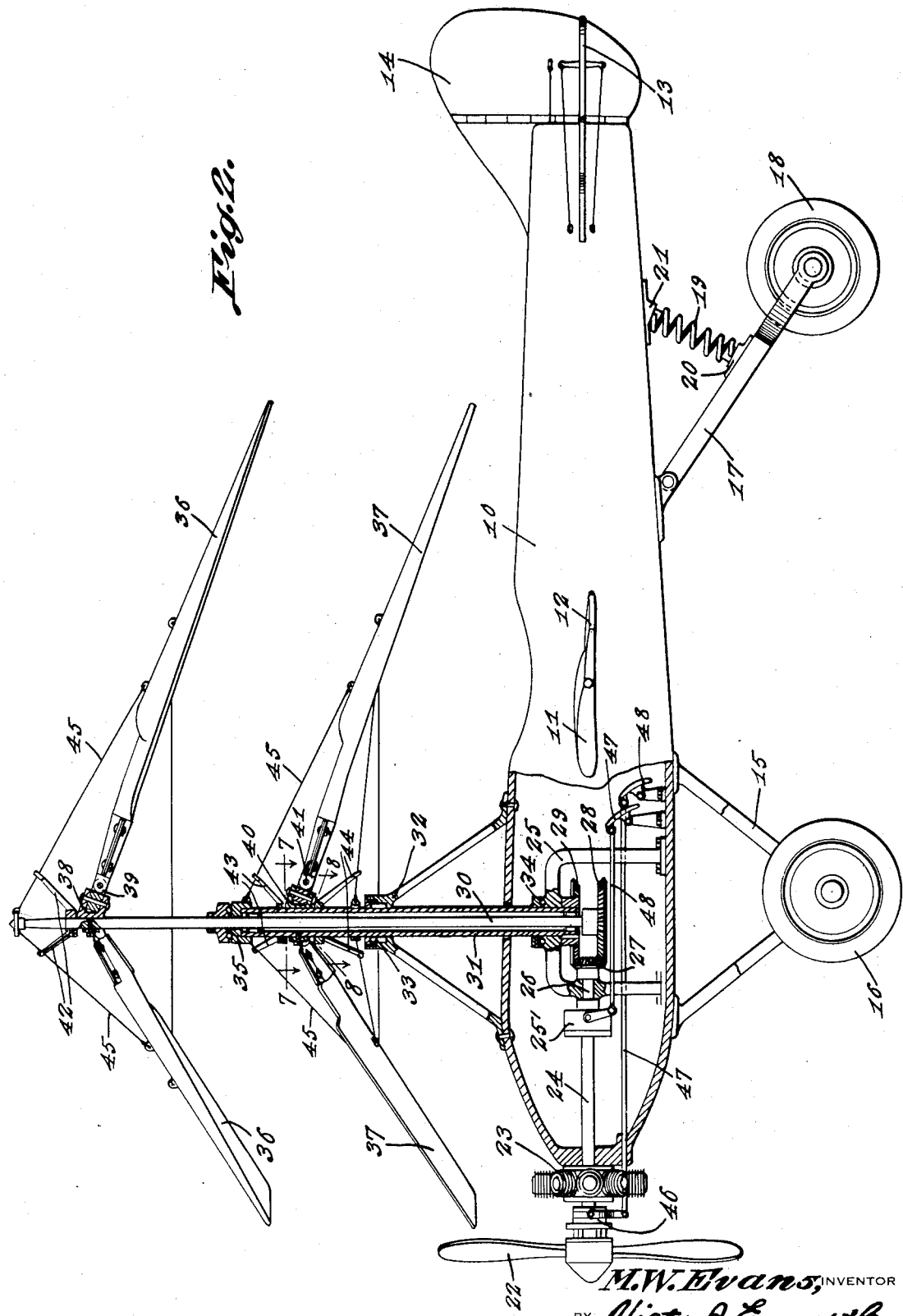

1,906,143

UNITED STATES PATENT OFFICE

MERWIN W. EVANS, OF HOLLAND PATENT, NEW YORK

HELICOPTER

Application filed May 27, 1932. Serial No. 614,007.

The invention relates to aircrafts and more particularly to that style known as helicopters.

The primary object of the invention is the provision of an aircraft of this character, wherein rotary lifting means is associated therewith so that the craft can make vertical descent or ascent and at the same time when in flight will be assured of balance as the said means will function as sustaining planes for the craft, the latter being novel in construction.

Another object of the invention is the provision of a craft of this character, wherein the lifting means is of novel form and its fuselage is preferably made from steel tubing and wire braces, while each wing spar may be constructed either of metal or light wood, preferably of metal. The lifting means for the craft when operated will enable a quick ascent or descent with perfect safety, thus eliminating long ground runs or air runs for this purpose.

A further object of the invention is the provision of a craft of this character, wherein the lifting means which includes a plurality of wings is properly sustained to withstand strains and stresses during the ascent and descent of the craft, the latter being equipped with standard elevators, rudder and landing gear, while the tail wheel or trailer wheel will maintain the ship setting level on landing thereof.

A still further object of the invention is the provision of a craft of this character, which is comparatively simple in construction, thoroughly reliable and efficient in its working, sturdy, durable, and comparatively inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 1 is a top plan view of an aircraft constructed in accordance with the invention.

Figure 2 is a side elevation of the same and being partly in section.

Figure 3 is a longitudinal sectional view through one of the wings of the lifting means.

Figure 4 is a sectional view on the line 4—4 of Figure 3.

Figure 5 is a sectional view on the line 5—5 of Figure 3.

Figure 6 is a sectional view on the line 6—6 of Figure 3.

Figure 7 is a sectional view on the line 7—7 of Figure 2.

Figure 8 is a sectional view on the line 8—8 of Figure 2.

Similar reference characters indicate corresponding parts throughout the several views in the drawings.

Referring to the drawings in detail, the aircraft, which is of the helicopter type, comprises a fuselage 10 having the substantially bullet form and carries the main planes or wings 11, these being laterally extended at opposite sides thereof and preferably of the monoplane style, the ailerons 12 supported at the heel edge of the wings or planes 11, which are for the purpose of supporting said ailerons only, the elevators 13 and rudder 14, the fuselage with the wings or planes, ailerons, elevators and rudder being of standard equipment and such ailerons, elevators and rudder operable in any conventional way by the pilot or operator of the machine from within the fuselage.

The fuselage additionally has associated therewith a relatively broad landing gear 15 provided with the ground wheel 16 and also rearwardly of said fuselage and depending from its bottom is a hinged bracket or fork 17 having journaled therein the tail or trailing wheel 18, the bracket or fork being spring action through the medium of the spring 19 set in retainers 20 and 21 on said bracket or fork and the fuselage respectively.

At the nose end of the fuselage 10 is a pull propeller 22 of the bladed type operated from a motor 23, the blades of which are adjustable for varying the pitch of the same from zero pitch to maximum power development. The driving shaft 24 of the motor extends into the fuselage and is journaled in a stand 25 therein. It is intended that on the starting of the motor 23 the propeller 22 is to revolve at all times and during ascent of the craft the cooling of said motor will be effected. The driving shaft 24 has arranged therein a manually controlled clutch 25' for the releasable coupling of a stud shaft 26 constituting a continuation of the drive shaft. The stud shaft 26 carries a pinion 27 meshing with reversely driven gears 28 and 29 respectively. The gear 28 is fixed to the lower end of a vertical shaft 30, while the gear 29 is fixed to the lower end of a tubular shaft 31 having the shaft 30 journaled therein. This shaft 31 extends vertically with the shaft 30 but is of less length than the latter.

Rising from the fuselage 10 above the top thereof is a bearing 32 formed with a roller bearing fitted hub 33 receiving the tubular shaft 31, while the stand 25 is fitted with an anti-friction bearing 34 for said tubular shaft 31. The tubular shaft 31 at its upper end carries an anti-friction bearing cap 35 for the shaft 30.

The shafts 30 and 31 operate the lifting means which includes the series of tri-wings or planes 36 and 37 respectively. The series 36 of wings or planes are carried by the shaft 30 and this carriage is had through the medium of a spider-like hanger 38 fixed to said shaft and fitted with universal joints 39 connecting the wings or planes 36 therewith, while the series 37 of wings or planes are carried by the tubular shaft 31 and this carriage is had through the spider-like hanger 40, while the universal joints 41 connect the wings or planes 37 therewith.

Mounted on the shafts 30 and 31 are the respective braces 42, 43 and 44, the braces 43 and 44 being common to the wings or planes 37, while the brace 42 is common to the wings or planes 36. Passed through these braces and connected with the respective series of wings or planes 36 and 37 are guy wires 45 which function to permit slight displacement of the wings or planes 36 and 37, yet maintain the same in their arranged relation to each other. The wings or planes 36 and 37 function as a helicopter to permit the ascent and descent of the aircraft in a vertical direction and with minimum take-off or ascent, that is, ground travel, as well as air travel when descending.

The propeller 22 is coupled with the drive shaft 24 of the engine 23 and the blades of such propeller can be adjusted to alter or vary the pitch thereof through the control 46 which is manually operated by the lever 47 and likewise the clutch 25 is operated by the lever 48, these being within the cockpit or pilot's compartment of the fuselage in convenient reach of a pilot or operator of the machine.

When ascent or descent is to be made by the aircraft an operator frees the propeller 22 and drives the planes or wings 36 and 37 through the power shaft 24 from the engine 23, this being effected by operating the clutch 35 and in this manner the craft will operate as a helicopter as should be obvious.

When the craft is in flight the propeller 22 is in positive driving connection with the engine 23 and the planes 36 and 37 are thrown out of gear.

It is preferable to have the fuselage 10 made from metal with its spars either of metal or light wood although the fuselage may be otherwise constructed.

The planes or wings 36 and 37 are of hollow formation having internal bracing means 49, while the main planes or wings, as well as the ailerons, elevators and rudder are of standard equipment.

The clutch 25' is of the one-way or overrun type to allow the vanes to revolve freely and automatically when the motor 23 is slowed down or stopped for any reason. By reason of this arrangement should the motor stop it renders it impossible for any one to stall the plane in mid-air and thus such clutch makes this part of the equipment foolproof.

In the design of the planes 36 and 37 each is formed with a high speed surface at the outer end and a low speed high lift surface at the inner end which overcomes the low lifting power common to air pressure.

It is thought that the construction and manner of operation of the aircraft will be clearly understood from the detailed description hereinbefore set forth and therefore a more extended explanation has been omitted for the purpose of brevity.

What is claimed is:—

In an aircraft, a fuselage having a plane, ailerons associated with the plane, elevators associated with the fuselage, a rudder at the rear end of the fuselage, a motor driven propeller at the fore end of the fuselage, means for releasing the propeller from the motor, interfitted shafts mounted in the fuselage and rising vertically above the same, gear connections between the motor and said interfitted shafts, means for controlling the connections between the motor and said shafts, tri-wings associated with the said shafts, spider hangers on the shafts, universal joints connecting the tri-wings with said hangers, guy wires having connection between the shafts and said tri-wings, and braces associated with the shafts and said wires.

In testimony whereof I affix my signature.

MERWIN W. EVANS.